(12) United States Patent
Hanumaiah et al.

(10) Patent No.: US 10,133,323 B2
(45) Date of Patent: Nov. 20, 2018

(54) PROCESSOR CONTROL SYSTEM

(71) Applicant: Arizona Board of Regents for and on behalf of Arizona State University, Scottsdale, AZ (US)

(72) Inventors: Vinay Hanumaiah, Campbell, CA (US); Sarma Vrudhula, Chandler, AZ (US); Benjamin Gaudette, Phoenix, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 995 days.

(21) Appl. No.: 14/207,936

(22) Filed: Mar. 13, 2014

(65) Prior Publication Data
US 2014/0277815 A1  Sep. 18, 2014

Related U.S. Application Data

(60) Provisional application No. 61/781,499, filed on Mar. 14, 2013.

(51) Int. Cl.
*G06F 1/20* (2006.01)
*G05D 23/19* (2006.01)
*G06F 1/32* (2006.01)

(52) U.S. Cl.
CPC ............. *G06F 1/206* (2013.01); *G05D 23/19* (2013.01); *G06F 1/324* (2013.01); *Y02D 10/126* (2018.01); *Y02D 10/16* (2018.01)

(58) Field of Classification Search
CPC ....... G05D 23/19–23/32; G06F 1/3203; G06F 1/206; G06F 1/324; G06F 1/20; G05B 13/048; Y02B 60/1217; Y02B 60/1275
(Continued)

(56) References Cited

U.S. PATENT DOCUMENTS 5,422,806 A    6/1995  Chen et al.
2008/0162388 A1*  7/2008  de la Guardia ......... G06F 1/206
                                                                706/14
(Continued)

OTHER PUBLICATIONS

R. Cochran, S. Reda, 'Thermal Prediction and Adaptive Control Through Workload Phase Detection' ACM Transactions on Design Automation of Electronic Systems, vol. 18, No. 1, Article 7, Pub. date: Dec. 2012.*
(Continued)

*Primary Examiner* — Robert E Fennema
*Assistant Examiner* — Shon Foley
(74) *Attorney, Agent, or Firm* — Fish & Richardson P.C.

(57) ABSTRACT

A control system for use with a processor includes: (i) a controller configured to receive prediction information for a predicted temperature associated with the processor, and to determine a speed of operation for the processor based at least on a thermal model of the processor and the predicted temperature, where the speed supports an operational objective of the processor; and (ii) an error estimator that is separate from the controller, and that is configured to receive temperature information obtained from the processor operating at the speed, to determine updated prediction information based, at least in part, on the temperature information, and to output the updated prediction information to the controller.

23 Claims, 5 Drawing Sheets

(58) Field of Classification Search
USPC .................................................. 700/299, 300
See application file for complete search history.

(56) References Cited

U.S. PATENT DOCUMENTS

| | | | |
|---|---|---|---|
| 2009/0204267 A1* | 8/2009 | Sustaeta ............. | G05B 13/0285 700/291 |
| 2010/0057404 A1 | 3/2010 | Dittmann et al. | |
| 2010/0191936 A1 | 7/2010 | Khatri et al. | |
| 2010/0194321 A1 | 8/2010 | Artman et al. | |
| 2011/0264938 A1 | 10/2011 | Henroid et al. | |
| 2014/0215241 A1 | 7/2014 | Yoon et al. | |
| 2014/0237272 A1 | 8/2014 | Sadowski et al. | |
| 2014/0281609 A1 | 9/2014 | Hanumaiah et al. | |
| 2015/0106640 A1* | 4/2015 | Brackman ............... | G06F 1/206 713/324 |

OTHER PUBLICATIONS

International Search Report and Written Opinion, PCT/US2014/025471, dated Jun. 17, 2014, 14 pages.
Sharifi, Shervin, et al., "Accurate Direct and Indirect On-Chip Temperature Sensing for Efficient Dynamic Thermal Management," IEEE Transactions on Computer-Aided Design of Integrated Circuits and Systems, vol. 29, No. 10, Oct. 2010, pp. 1586-1599.
Wang, Xiaorui, et al., "Adaptive Power Control with Online Model Estimation for Chip Multiprocessors," IEEE Transactions on Parallel and Distributed Systems, vol. 22, No. 10, Oct. 2011, pp. 1681-1696.
Welch, Greg, et al., "An Introduction to the Kalman Filter," University of North Carolina at Chapel Hill, Jul. 24, 2006, 16 pages.
Borkar, Shekhar, "Thousand Core Chips—A Technology Perspective," DAC 2007, Jun. 4-8, 2007, pp. 746-749.
Boyd, Stephen, et al., "Convex Optimization," Cambridge University Press, 2004, 730 pages.
Bartolini, Andrea, et al., "A distributed and self-calibrating model-predictive controller for energy and thermal management of high-performance multicores," Proceedings of Design, Automation Test in Europe Conference, Mar. 14-18, 2011.
Chantem, Thidapat, et al., "Online Work Maximization under a Peak Temperature Constraint," in Proc. ISLPED, 2009, pp. 105-110.
Chantem, Thidapat, et al., "Temperature-Aware Scheduling and Assignment for Hard Real-Time Applications on MPSoCs," in Proc. DATE, 2008, pp. 288-293.
Cochran, Ryan, et al., "Pack & Cap: Adaptive DVFS and Thread Packing Under Power Caps," MICRO'11, Dec. 3-7, 2011, 11 pages.
Cohen, Aviad, et al., "On Estimating Optimal Performance of CPU Dynamic Thermal Management," IEEE Computer Architecture Letters, Jan.-Dec. 2003, vol. 2, No. 1, pp. 6.
Coskun, Ayse K., et al., "Static and Dynamic Temperature-Aware Scheduling for Multiprocessor SoCs," IEEE Transactions on Very Large Scale Integration (VLSI) Systems, vol. 16, No. 9, Sep. 2008, pp. 1127-1140.
Dhiman, Gaurav, et al., "Dynamic voltage frequency scaling for multi-tasking systems using online learning," ISLPED '07 Proceedings of the 2007 international symposium on Low power electronics and design, pp. 207-212.
Esmaeilzadeh, Hadi, et al., "Dark Silicon and the End of Multicore Scaling," Proceedings of the 38$^{th}$ International Symposium on Computer Architecture (ISCA '11), Jun. 4-8, 2011, 12 pages.
Fu, Yong, et al., "Feedback Thermal Control for Real-time Systems," IEEE Real-Time and Embedded Technology and Applications Symposium (RTAS'10), Apr. 2010.
Ghasemazar, Mohammed, et al., "Minimizing the Power Consumption of a Chip Multiprocessor under an Average Throughput Constraint," 10$^{th}$ Intl. Symposium on Quality Electronic Design, 2010, pp. 362-371.
Guthaus, Matthew R., et al., "MiBench: A free, commercially representative embedded benchmark suite," in Proc. WWC, 2001, pp. 3-14.

Hanumaiah, Vinay, et al., "Performance Optimal Online DVFS and Task Migration Techniques for Thermally Constrained Multi-core Processors," IEEE Transactions on Computer-Aided Design, vol. 30, No. 11, Nov. 2011, pp. 1677-1690.
Hanumaiah, Vinay, et al., "Reliability-aware Thermal Management for Hard Real-time Applications on Multi-core Processors," in Proc. DATE, 2011, pp. 184-189.
Hanumaiah, Vinay, et al., "The MAGMA Thermal Simulator," online, http://vrudhula.lab.asu.edu/magma/index.php/Main_Page, last modified Apr. 24, 2011, 3 pages.
Hanumaiah, Vinay, et al., "Throughput Optimal Task Allocation under Thermal Constraints for Multi-core Processors," DAC'09, Jul. 26-31, 2009, pp. 776-781.
"HP Research Smart Cooling," online http://www.hpl.hp.com/research/smart_cooling/, Hewlett-Packard Development Company, 2009, accessed Mar. 7, 2014, 2 pages.
Huang, Wei, et al., "An Improved Block-Based Thermal Model in HotSpot 4.0 with Granularity Considerations," Proc. WDDD, 2007, pp. 1-14.
Huang, Wei, et al., "HotSpot: A Compact Thermal Modeling Methodology for Early-Stage VLSI Design," IEEE Transactions on Very Large Scale Integration (VLSI) Systems, vol. 14, No. 5, May 2006, pp. 501-513.
Intel, "Advanced Configuration and Power Interface Specification," http://www.acpi.info/spec.htm, Nov. 13, 2013.
Intel R® 64 and IA-32 Architectures Software Developer's Manual, Intel Corporation, Aug. 2012.
Isci, C., et al., "Live, Runtime Phase Monitoring and Prediction on Real Systems with Application to Dynamic Power Management," Proc. Intl' Symposium Microarch. (MICRO), 2006, 12 pages.
Jayaseelan, Ramkumar, et al., "Temperature aware Task Sequencing and Voltage Scaling," in Proc. ICCAD, 2008, pp. 618-623.
Jung, Hwisung, et al., "Stochastic Dynamic Thermal Management: A Markovian Decision-based Approach," Proceedings of ICCD, 2006, pp. 452-457.
Kalman, R.E., "A New Approach to Linear Filtering and Prediction Problems," Transactions of the ASME-Journal of Basic Engineering, 82 (Series D): 35-45, 1960, 12 pages.
Laudon, James, "Performance/Watt: The New Server Focus," ACM SIGARCH Computer rchitecture News—Special issue, vol. 33, Issue 4, Nov. 2005, pp. 5-13.
Liang, Wen-Yew, et al., "An Energy Conservation DVFS Algorithm for the Android Operating System," Journal of Convergence, vol. 1, No. 1, Dec. 2010, pp. 93-100.
Liao, Weiping, et al., "Temperature and Supply Voltage Aware Performance and Power Modeling at Microarchitecture Level," IEEE Transactions on Computer-Aided Design of Integrated Circuits and Systems, vol. 24, No. 7, Jul. 2005, pp. 1042-1053.
Mulas, Fabrizio, et al., "Thermal Balancing Policy for Streaming Computing on Multiprocessor Architectures," DATE 2008, pp. 734-739.
Munkres, James, "Algorithms for the Assignment and Transportation Problems," Journal of the Society for Industrial and Applied Mathematics, Mar. 1957, vol. 5, No. 1, pp. 32-38.
Murali, Srinivasan, et al., "Temperature-Aware Processor Frequency Assignment for MPSoCs Using Convex Optimization," CODES+ISSS'07, Sep. 30-Oct. 3, 2007, pp. 111-116.
Pallipadi, Venkatesh, et al., "The ondemand Governor: Past, Present, and Future," Proceedings of Linux Symposium, 2006, pp. 215-230.
Papadimitriou, Christos H., et al., "Combinatorial Optimization: Algorithms and Complexity," Dover Publications, 1998.
Powell, Michael D., et al., "Heat-and-Run: Leveraging SMT and CMP to Manage Power Density Through the Operating System," 11$^{th}$ International Conference on Architectural Support for Programming Languages and Operating Systems (ASPLOS 2004), pp. 260-270.
Rao, Ravishankar, et al., "Efficient online computation of core speeds to maximize the throughput of thermally constrained multi-core processors," Proc. ICCAD, 2008, pp. 537-542.
Rao, Ravishankar, "Fast and Accurate Prediction of the Steady-State Throughput of Multicore Processors Under Thermal Constraints,"

(56) References Cited

OTHER PUBLICATIONS

Computer-Aided Design of Integrated Circuits and Systems, IEEE Transactions, Oct. 2009, vol. 28, Issue 10, pp. 1559-1572.

Rao, Ravishankar, "Fast and Accurate Techniques for Early Design Space Exploration and Dynamic Thermal Management of Multi-Core Processors," Ph.D. Dissertation, Arizona State University, 2008.

Rao, Ravishankar, et al., "Performance Optimal Processor Throttling Under Thermal Constraints," in Proc. CASES, 2007, pp. 257-266.

Rotem, Efraim, et al., "Power-Management Architecture of the Intel Microarchitecture Code-Named Sandy Bridge," IEEE Micro., vol. 32, No. 2, Mar./Apr. 2012, pp. 20-27.

Shin, Donghwa, et al., "Energy-Optimal Dynamic Thermal Management: Computation and Cooling Power Co-Optimization," IEEE Transactions on Industrial Informatics, vol. 6, No. 3, Aug. 2010 pp. 340-351.

"Single-chip Cloud Computer," online http://www.intel.com/content/www/us/en/research/intel-labs-single-chip-cloud-overview-paper.html?wapkw=single-chip+cloud+computer#channel=f23085342953ff&origin=http%3A%2F%2Fwww.intel.com copyright 2009, accessed on Mar. 7, 2014, 2 pages.

Skadron, Kevin, et. al, "Control-Theoretic Techniques and Thermal-RC Modeling for Accurate and Localized Dynamic Thermal Management," Proc. HPCA, 2002, pp. 17-28.

Snowdon, David C., et al., "Koala: A Platform for OS-level power management," Proceedings of the 4th ACM European conference on Computer systems, Jan. 1, 2009, pp. 289-302.

SPEC2006, "The SPEC benchmark," http://www.spec.org/cpu2006/, Sep. 7, 2011, 2 pages.

Srinivasan, Viji, et al., "Optimizing Pipelines for Power and Performance," in Proc. MICRO, 2002, pp. 333-344.

Wang, Yefu, et al., "Temperature-Constrained Power Control for Chip Mutliprocessors with Online Model Estimation," ISCA '09, Jun. 20-24, 2009, 11 pages.

Zanini, Francesco, et al., "Multicore Thermal Management with Model Predictive Control," European Conference on Circuit Theory and Design, 2009, pp. 711-714.

Zhang, Sushu, et al., "Thermal aware task sequencing on embedded processors," DAC'10, Jun. 13-18, 2010, pp. 585-590.

* cited by examiner

PROCESSOR CONTROL SYSTEM

CROSS-REFERENCE TO RELATED APPLICATION

This disclosure claims priority to U.S. Provisional Application No. 61/781,499, which was filed on Mar. 14, 2013. U.S. Provisional Application No. 61/781,499 is incorporated by reference into this disclosure.

STATEMENT REGARDING FEDERALLY SPONSORED RESEARCH OR DEVELOPMENT

The invention made with government support under Contract or Grant No. CRS-EHS-509540 awarded by the National Science Foundation (NSF). The government has certain rights in the invention.

TECHNICAL FIELD

This disclosure relates generally to a system for controlling processor cores to achieve a specified operational objective.

BACKGROUND

A microprocessor (or simply "processor") may include one core or multiple cores. A processor having multiple cores is generally called a multi-core processor. A core is typically defined as a central processing unit (CPU) that is capable of receiving and executing instructions independently. In a multi-core processor, multiple cores may cooperate to execute a computer program or programs, e.g., to execute various "threads" of the computer program.

Multi-core processors may include tens or hundreds of cores on a single die. Because of the increased processing abilities afforded by multiple cores, multi-core processors have become the standard for computing in various market segments, such as smartphones, laptops, desktop personal computers (PCs), and servers in datacenters. Among the issues facing processor manufacturers today is the ability to control the operation of individual cores so as to improve some measure of quality of service.

SUMMARY

An example control system for use with a processor may include: (i) a controller configured to receive prediction information for a predicted temperature associated with the processor, and to determine a speed of operation for the processor based at least on a thermal model of the processor and the predicted temperature, where the speed supports an operational objective of the processor; and (ii) an error estimator that is separate from the controller, and that is configured to receive temperature information obtained from the processor operating at the speed, to determine updated prediction information based, at least in part, on the temperature information, and to output the updated prediction information to the controller. The example control system may include one or more of the following features, either alone or in combination.

The controller may be configured to provide the predicted temperature to the error estimator. The error estimator may be configured to determine the updated prediction information based on both the predicted temperature and the temperature information. The error estimator may be configured to receive measured power information obtained from operation of the processor and predicted power information from the controller. The predicted power information may be obtained from a power model on the controller. The error estimator may be configured to use the measured power information and the predicted power information in a process for determining the updated prediction information.

The controller may be configured to obtain a metric corresponding to the operational objective of the processor, and to incorporate the metric into determination of the speed of operation of the processor.

The processor may be a multi-core processor, and the temperature information may be obtained from the processor may be a single temperature value. The single temperature value may be a temperature of a package of the processor.

The prediction information may correspond to an error between previously-obtained temperature information and a previous predicted temperature. The controller may be configured to update the predicted temperature based on the prediction information.

The error estimator may be a Kalman filter, and the controller may be a dynamic thermal management controller.

The error estimator, the controller, and the processor may be part of a closed-loop system. The operational objective may be improved energy efficiency, improved processor performance, or a combination thereof. The operational objective may be changeable in real-time to thereby cause changes in operation of the controller and the error estimator.

The systems and systems described herein, or portions thereof, can be implemented as a computer program product that includes instructions that are stored on one or more non-transitory machine-readable storage media, and that are executable on one or more processing devices to control (e.g., to coordinate) the operations described herein. The systems and systems described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DETAILED DESCRIPTION

Described herein are example systems for controlling processor cores to achieve a specified operational objective.

For example, the speed of the cores may be controlled to achieve a desired level of performance or energy efficiency.

In this regard, the use of multiple cores in a processor allows the performance of processor to improve within a limited power budget by exploiting concurrent execution of threads on the multiple cores. As multi-core scaling continues, keeping the number of transistors within a core relatively constant (thereby reducing power use per core) allows for an increasing number of cores, thus improving performance through exploitation of parallelism. Multi-core scaling may be curtailed by rising power dissipation, the limits of which are determined by the maximum temperature a chip can tolerate. Because high temperatures can lead to functional and timing errors, reduced operational lifetimes, and increased power dissipation (which, in turn, may increase temperature), as more cores are added, an increasing amount of the processor may have to become "dark", e.g., under-clocked or powered-off. This is known, generally, as the utilization wall.

One way to address the utilization wall" is to improve the energy efficiency of the processor. Increasing energy efficiency may have multiple benefits, ranging from prolonging battery life of devices, such as smart phones and laptops, to lowering cooling costs of devices, such as servers. System-level run-time systems that perform energy management under thermal constraints are referred to as dynamic thermal management (DTM).

One commonly used metric for measuring energy efficiency is performance per watt (PPW), which reflects the number of instructions executed (referred to also as "throughput") per Joule of energy expended. Performance is defined as the number of operations completed per second. It is often desirable to operate a processor at the most energy efficient operating point, without significant sacrifice to performance.

Figure 1:
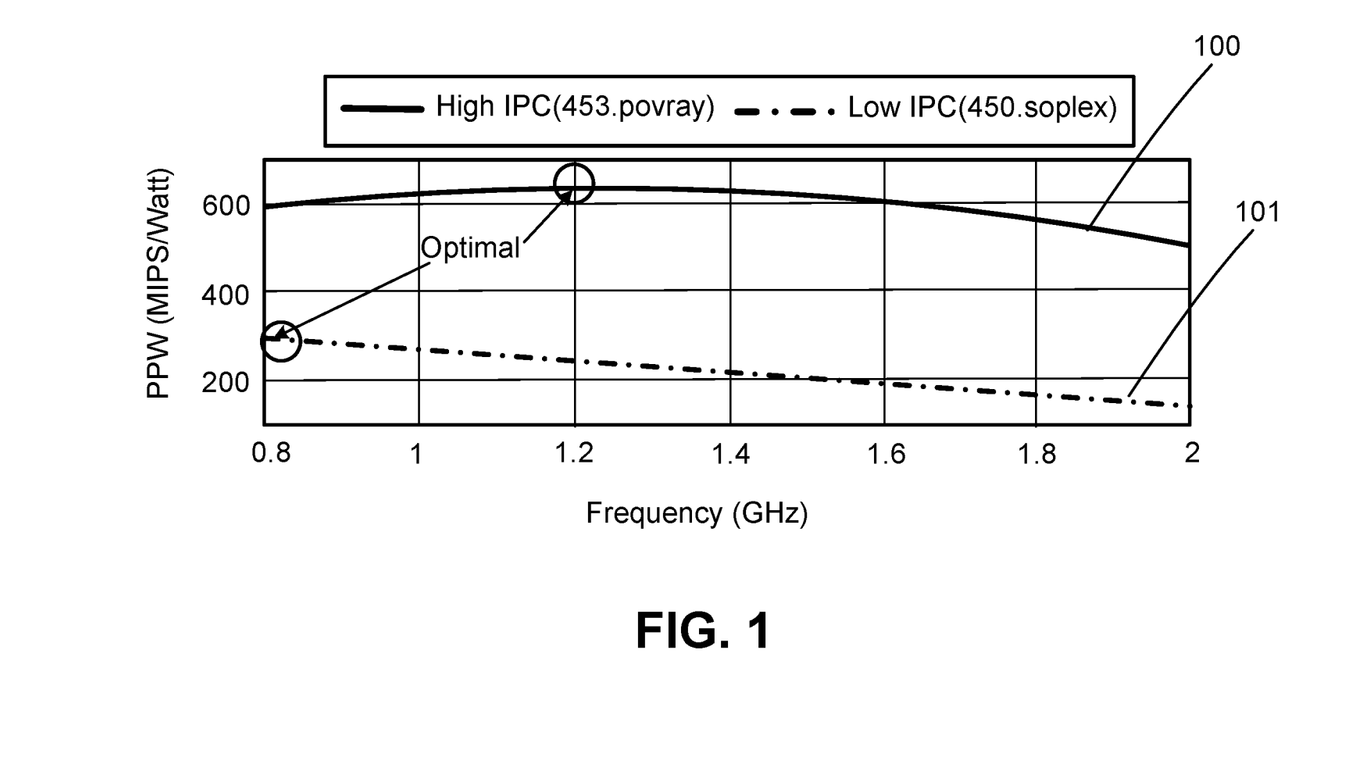
FIG. 1 is graph showing examples of different energy efficiencies for different executions of instructions-per-cycle (IPC).

FIG. 1 shows the PPW 100 of an example quad-core processor operating at relatively high instruction-per-cycle (IPC) and the PPW 101 of that same processor operating at relatively low instruction-per-cycle (IPC). In this regard, "high" and "low" are used as relative terms, and are not meant to imply specific values, merely that a higher IPC includes more IPC than a lower IPC. As shown in FIG. 1, resulting curves of PPWs 100, 101 are concave in shape. The PPW metric is thus a quasi-concave function of core speed (i.e., frequency). This concave nature generally indicates the existence of a unique operating point that maximizes the energy efficiency of the processor. As shown in FIG. 1, depending on the IPC and other parameters (e.g., temperature, power consumption, etc.), the maximum PPW operating point shifts.

Described herein is an example closed-loop control system configured to predict core speed/voltage settings for a multi-core processor to support (e.g., to achieve or promote) a desired objective, such as improved energy efficiency (e.g., maximized energy efficiency), enhanced processor performance (e.g., maximized processor performance), or some compromise of energy efficiency and processor performance. The closed-loop control system may use power and thermal model estimations and attempt to reduce prediction errors using, e.g., an error estimator such as a Kalman filter. In some processors, changes to the core speed propagate automatically to the core voltage; accordingly, changing speed (s) results in a corresponding core voltage (v) change. The control system may also be controllable to adapt to system dynamics in real-time.

In some implementations, the control system (i) is configured to estimate power and thermal models; (ii) is configured to reduce noise sensitivity through the use of filtering when predicting temperature and power consumption values, and (iii) is not restricted to any class of objective function or constraints of DTM, e.g., maximizing performance or limiting the maximum temperature of a processor or power consumption of a processor.

In an example implementation, to predict core speed/voltage settings (e.g., an optimal speed/voltage setting) in real-time, the control system incorporates power and thermal models that take into account both coupled heat interaction between cores and temperature-dependent transistor leakage on a multi-core platform. In order to reduce noise from thermal sensors used to detect heat, in some implementations the control system incorporates a Kalman filter (as noted above) to recursively reduce noisy sensor inputs. In some implementations, therefore, the control system's prediction model is self-optimizing over time. The control system may also coordinate multiple, independent dynamic voltage and frequency scaling (DVFS) settings of cores on a multi-core platform. The implementation may be self-contained and may be installed on any appropriate processor without requiring full prior knowledge of the architecture or operation processor. In some implementations, instead of a fixed objective function, the control system optimizes for a generalized form of energy efficiency, Per $f^\alpha$/Power, where $\alpha$ is a control parameter that is used to strike a performance-power balance.

The example control system (and corresponding processes implemented thereby) are not limited to use with a heterogeneous, multi-core processor as described herein, but rather are usable on any appropriate type of single-core or multi-core processor. The control system may be implemented by a computing device in communication with the processor or by one or cores of the processor itself, in the case of a multi-core processor. In some implementations, the control system may be implemented on the processor itself.

Among the components of an example implementation of the control system are power and thermal models for the processor under consideration. As described below, these components may be used to predict power consumption and temperatures of the cores.

Figure 2:
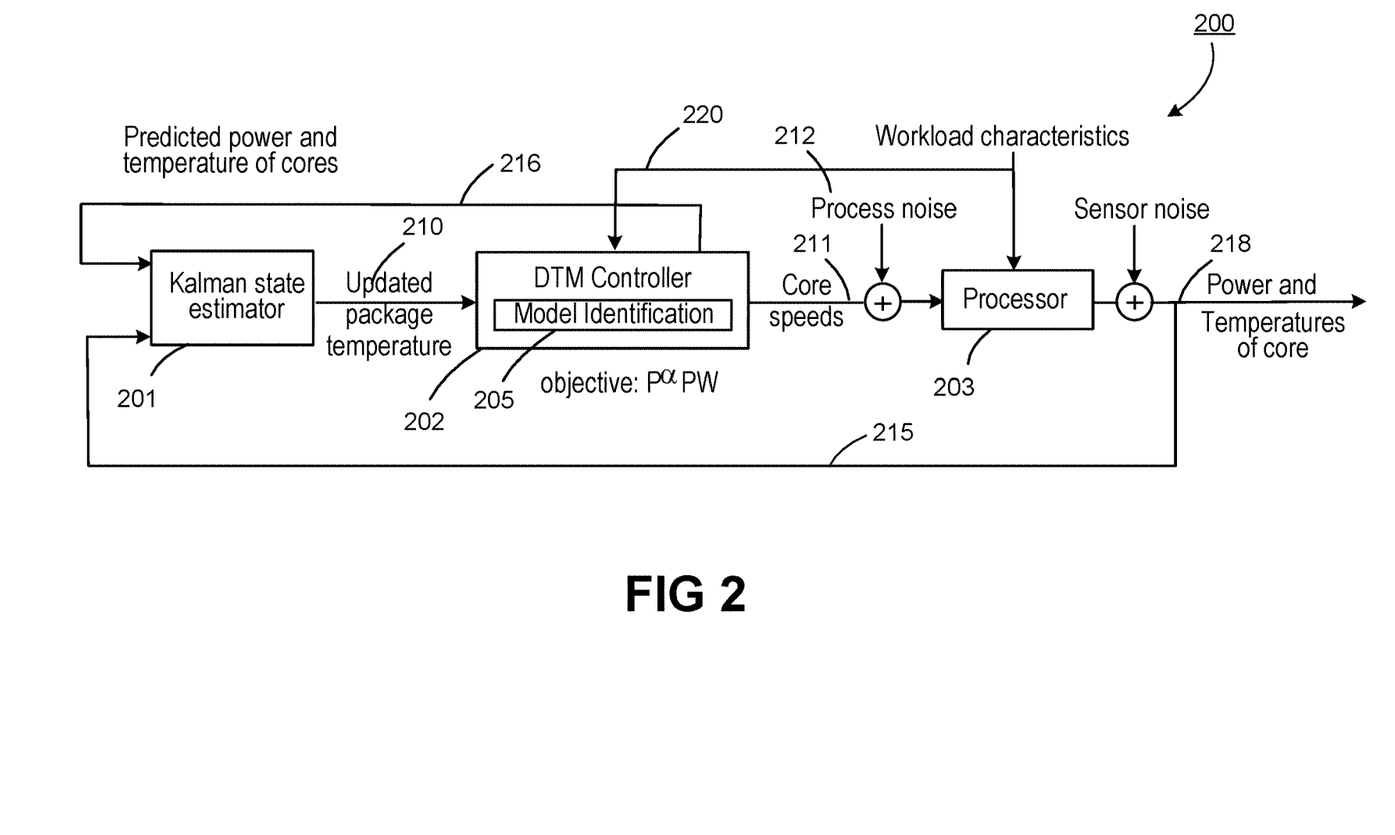
FIG. 2 is a block diagram of an example closed loop control system for controlling processor cores to achieve a specified operational objective.

FIG. 2 shows the structure of an example implementation of a control system configured to perform the functions described herein. As shown in FIG. 2, the example control system 200 is implemented as a closed-loop system, and includes a Kalman filter (state estimator) 201, a DTM controller 202, and the processor 203, communicatively connected in the configuration shown. As described in more detail below, DTM controller 202 is configured to generate DVFS states for a next operational time interval. The DVFS states are generated based on determined power and thermal information, a single current package temperature, and core utilization. Kalman filter 201 is used to reduce prediction errors caused by model inaccuracies and/or sensor noise. Kalman filter 201 uses current prediction errors based on the power and thermal models to determine corrections to state variables. The corrected state variables are then incorporated into the models in DTM controller 202. In the example models described below, information about the processor package temperature is the state that the Kalman filter predicts and updates based on measurements.

Characterization of thermal and power behavior of a processor is performed to predict processor core temperatures and power consumption given core speeds. Any appropriate power and thermal models may be used by the control system described herein; those presented are examples. The thermal model described is a simplified version of the thermal model described in the following publication: W. Huang, M. R. Stan, K. Skadron, K. Sankaranarayanan, and S. Ghosh, "HotSpot: A Compact Thermal Modeling Method for CMOS VLSI Systems," IEEE Trans. VLSI Sys., vol. 14, pp. 501-513, (2006), incorporated herein by reference. The simplifications to the model include (i) each core having one thermal node, as a processor usually has at most one power or thermal sensor per core; (ii) the capacitance associated with the die thermal nodes being ignored, as the die thermal constants are usually a few milliseconds and are not noticeable when sensors have very low sampling rate ($\approx$1 sample per 10 ms); and (iii) the package being considered to be a single thermal node.

Figure 3:
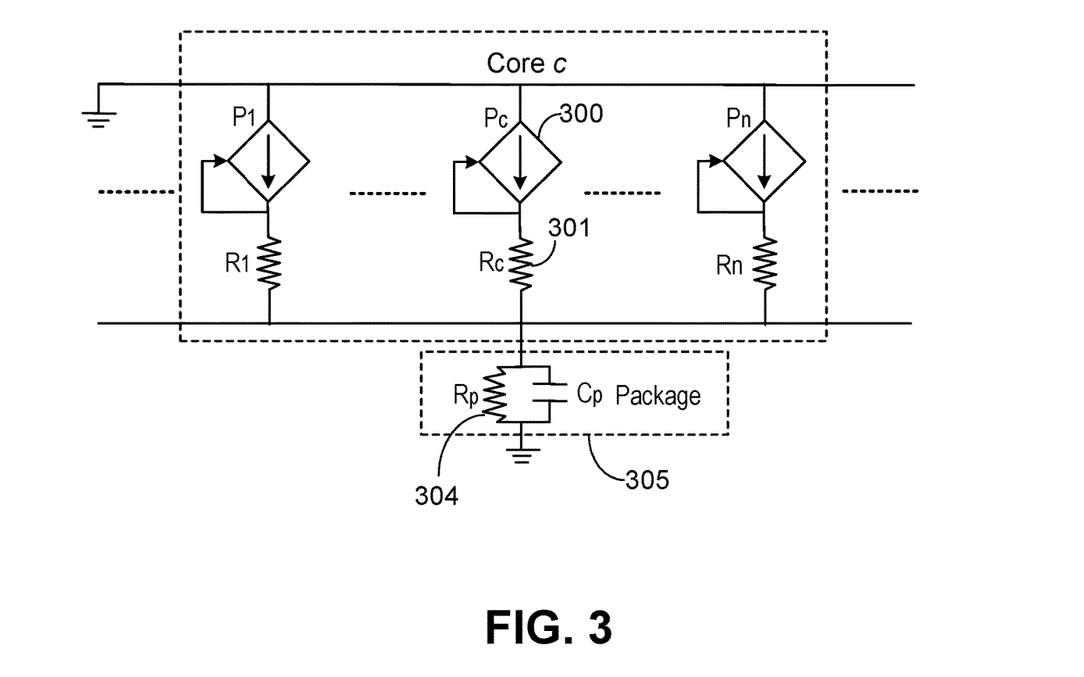
FIG. 3 is a circuit diagram showing an example of a thermal model that may be used in the closed loop control system.

Referring to FIG. 3, the thermal model is as follows. Table 1 below shows a list of notations used in the following description.

TABLE 1

| Symbol | Meaning |
|---|---|
| n | Number of cores |
| $s_c$ | Normalized clock speed of core c |
| $P_c$ | Total power consumed by core c |
| $P_{d,c,b}$ | Dynamic power of block b in core c |
| $T_c$ | Temperature of core c |
| $T_{max}$ | Maximum allowable temperature |
| $P_{l,c,i,j}$ | Leakage power coefficients of core c |
| $T_p$ | Package temperature |

In Table 1 above, dynamic power ($P_{d,c,b}$) consumption results from repeated capacitance charge and discharge on the output of gates of transistors used in a processor, such as a multi-core processor, and is related to core speed (frequency). Leakage power ($P_{l,c,i,j}$) depends on core temperature and voltage. Leakage power results from current leaking through transistors even when those transistors are turned-off, resulting in power dissipation.

According to the example thermal model used herein, every core c has an input power source $P_c$ 300. Each core is connected to processor's package through a corresponding vertical resistance 301 and to every adjacent core through a horizontal/lateral resistance (not shown). These resistances form a symmetric resistance matrix R, where $R_{ij}$ denotes the resistance connected between core i and core j. The package is considered a single node connected to the ambient with resistance $R_p$ 304 and capacitance 305 $C_p$, which are in parallel. $T_p$ and $T_c$ are the temperatures of the package p and of core c, respectively.

Referring to FIG. 3, the power-temperature relationship for a processor is given by:

$$\frac{dT_p(t)}{dt} = -\frac{1}{R_p C_p} T_p(t) + \frac{\sum_{c=1}^{n} P_c(s_c, T_c, t)}{C_p}, \quad (1)$$

$$T(t) = T_p(t) + RP(s, T, t). \quad (2)$$

where $s_c$ is the normalized ([0,1]) frequency/speed of core c and n is the total number of cores. In the equations, vectors and matrices are denoted in bold, e.g., P denotes a vector $P_c$ of all cores. In equations (1) and (2), power consumption depends on both core speed (dynamic power) and core temperature (leakage power), but does not explicitly depend on individual core voltages. This is because, in some example processors, changing a core speed automatically adjusts the core voltage correspondingly. The power and the temperature measurements of each core may be obtained in discrete time steps. Accordingly, the above equations are discretized to the following:

$$T_p(k+1) = aT_p(k) + b\sum_{c=1}^{n} P_c(s_c, T_c, k), \quad (3)$$

$$T(k) = T_p(k) + RP(s, T, k), \quad (4)$$

where $$a \stackrel{\Delta}{=} 1 - \frac{\Delta t}{R_p C_p} \text{ and } b \stackrel{\Delta}{=} \frac{\Delta t}{C_p},$$

and $\Delta t$ is the length of the discrete time step and k refers to time $k\Delta t$.

The power consumption of a core corresponds to the sum of dynamic power and leakage power, as shown in equation (5) below:

$$P_c(s_c, T_c, k) = P_{d,c} u_c(k) s_c^3(k) + P_{l,c,11} s_c(k) T_c(k) + \\ P_{l,c,01} T_c(k) + P_{l,c,12} s_c(k) T_c^2(k) + P_{l,c,02} T_c^2(k) \quad (5)$$

In equation (5), the first term denotes dynamic power consumption, where $P_{d,c}$ is the coefficient of the dynamic power consumption of core c at core utilization $u_c=1$ and maximum core speed $s_c=1$. Instructions-per-cycle (IPC) is the measure of core utilization used. $s_c^3$ is used in the first term of equation (5). This is because there is no explicit voltage control available on some example processors, and the core voltages are assumed to vary quadratically with the core speeds, hence the use of $s_c^3$.

The remaining terms of equation (5) represent the contribution of leakage power to the total power. The leakage power has an exponential dependence on core voltage and temperature. This explains the cyclical dependence of power consumption on temperature evidenced by equation (4).

A process for determining the models includes identifying parameters for both the power and the thermal models of a processor, namely a, b, and R of equations (3) and (4); and $P_{l,c,11}$, $P_{l,c,01}$, $P_{l,c,12}$, and $P_{l,c,02}$ of equation (5). In an example process for determining a model, a set of benchmarks is chosen and allocated randomly to various cores of the processor. Then, the cores are executed with varying core speeds for every few milliseconds, which continues for several minutes. During this time, core speeds, core utilization, power and temperature measurements are recorded (e.g., stored in memory). This information is used in identifying the above-mentioned power and thermal model parameters. Since power is an input in the thermal model, it may be advantageous to determine the parameters of the power model first. In other implementations, different processes may be used for determining the models, and different models than those presented below may be used.

Example Power Model

For the power model, the parameters determined in equation (5) namely $P_{d,c}$, $P_{l,c,11}$, $P_{l,c,01}$, $P_{l,c,12}$, and $P_{l,c,02}$, linearly combine to produce the power consumption of a core $P_c$. Therefore, the parameters can be determined using a linear least squares (LLS) formulation, as follows:

$$Y p_y = P_{tot} \quad (6)$$

where $P_{tot}(k) \triangleq \sum_{c=1}^{n} P_c(k)$ and k is the row index, which is also the time instant of the measurement. In equation (6), the total power consumption is used instead of individual core power consumption because the example processors used only provide total power measurement of cores. Vector $p_y$ includes power parameters (from equation (5)), which are to be determined and are given by:

$$P_y \triangleq [P_d^T P_{l,11}^T P_{l,01}^T P_{l,12}^T P_{l,02}^T]^T.$$

where Y is defined as:

$$Y \triangleq \begin{bmatrix} Y_d^T(1) & Y_{l,11}^T(1) & Y_{l,01}^T(1) & Y_{l,12}^T(1) & Y_{l,02}^T(1) \\ Y_d^T(2) & Y_{l,11}^T(2) & Y_{l,01}^T(2) & Y_{l,12}^T(2) & Y_{l,02}^T(2) \\ \vdots & \vdots & \ddots & \vdots & \vdots \\ Y_d^T(K) & Y_{l,11}^T(K) & Y_{l,01}^T(K) & Y_{l,12}^T(K) & Y_{l,02}^T(K) \end{bmatrix} \quad (7)$$

and where K is the number of measurements, $Y_{d,c}(k) \triangleq \mu_c(k) s_c^3(k)$, $Y_{l,11}(k) \triangleq s_c(k)T_c(k)$, $Y_{l,01}(k) \triangleq T_c(k)$, $Y_{l,12}(k) \triangleq s_c(k) T_c^2(k)$, and $Y_{l,02}(k) \triangleq T_c^2(k)$, $\forall c \in \{1, \ldots, n\}$.

Example Thermal Model

For the thermal model, a single equation for temperature T can be obtained by substituting $T_p(k)=T(k)-RP(k)$ from equation (4) into equation (3). The resultant equation for temperature T is:

$$T(k+1) = aT(k) + RP(k+1) + b\sum_{c=1}^{n} P_c(k) - aRP(k). \quad (8)$$

Equation (8) has an autoregressive (AR) term T, and also a moving average (MA) noise component e from the previous time interval. Thus, the model that describes equation (8) is an autoregressive moving average with exogenous input (ARMAX) model. P is the exogenous input in equation (8). Several approaches may be used to identify parameters of ARMA models. For example, the iterative linear least square (ILLS) method may be used to identify the above ARMAX model.

Example Kalman Filter

The model parameters determined above are valid for the measurements that were used in their derivation. Furthermore, the models determined above are not exact, but rather are a simplification of a higher order model. As such, predictions resulting from those models can be inaccurate. Accordingly, the control system employs a feedback of past measurements to correct future predictions. Also, the measurements may be corrupted by noise. A Kalman filter (state estimator), such as that shown in FIG. 2, may be used to correct for the imprecision of the models and the noise in the measurements. Generally, a Kalman filter uses a prediction error to update the state of the system (the models) so that the accuracy of future predictions is improved. Due to the cyclical and non-linear relationship between the core power consumption and the core temperature, an Extended Kalman filter, which is used for non-linear state space systems, is employed in the example implementation of FIG. 2.

Figure 4:
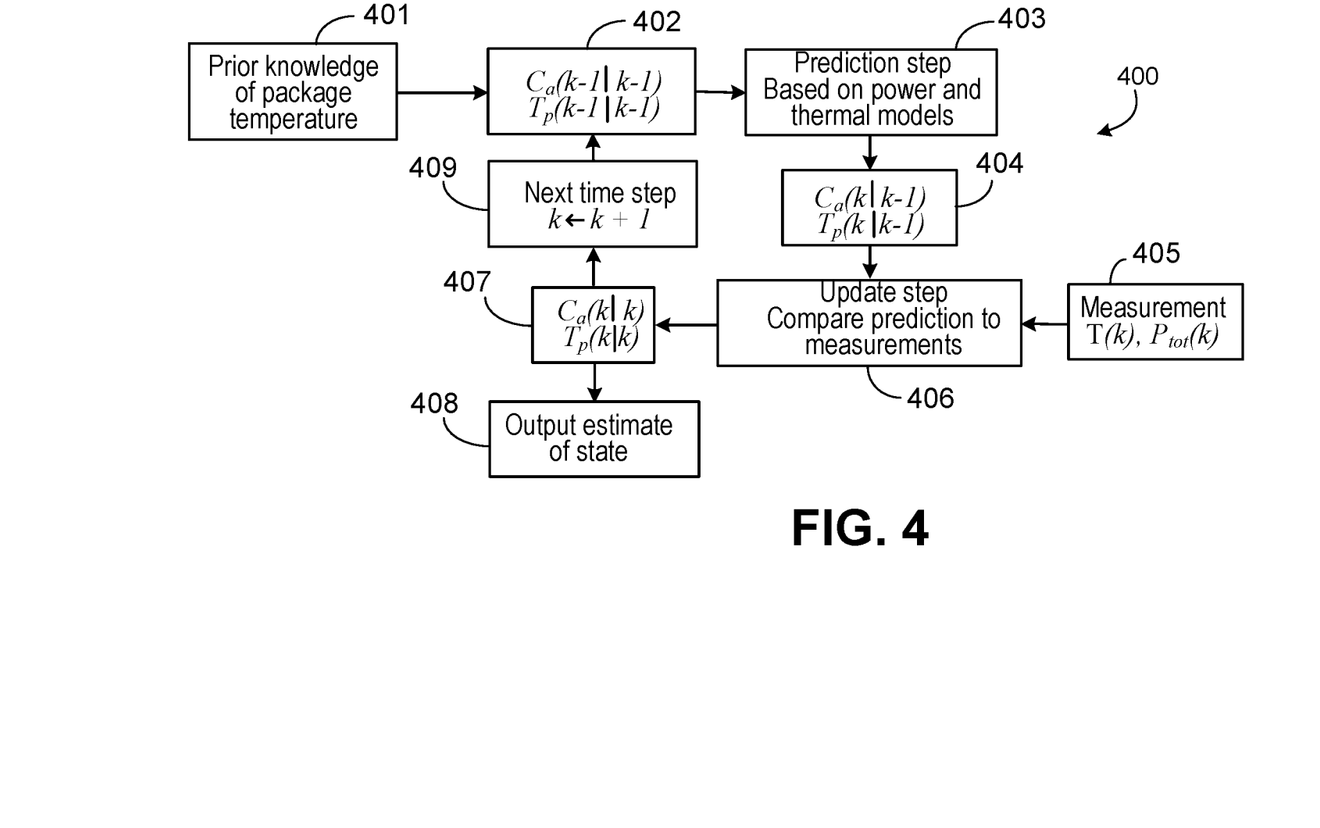
FIG. 4 is a block diagram showing operation of an example Kalman filter that may be used in the closed loop control system.

The basic operation of an example Kalman filter that may be used in the example system of FIG. 2 is shown in FIG. 4. In this example, FIG. 4 shows the operation 400 of a Kalman filter (KF) used to produce improved estimates of variables using measurements of package temperature 401. At time k-1, KF uses the knowledge of state 402 which, in this example, is the package temperature $T_p(k-1)$, to predict 403 the value of $T_p, T_p(k|k-1)$ and the outputs 404, e.g., temperature of all cores $\hat{T}(k)$ and the total processor power consumption $\hat{P}_{tot}(k)$. The notation k|k-1 denotes prediction at time k based on the values obtained in k-1. In a next time step k, KF obtains the measurement 405 of T(k) and $P_{tot}(k)$ and uses the error between prediction and measurement to correct/update 406 the prediction 407 of $T_p$, i.e. $T_p(k|k)$. Note that $T_p$ unlike other variable (T, $P_{tot}$) is not measured; it is an estimated value. In this example operation, it is necessary to correct this estimate so that future predictions of T(k) and $P_{tot}(k)$ deviate less from the measured values. The updated values are output 408, and substituted for values 402 at the next time step 409, and the foregoing is repeated. This process is continued as long as the controller is in operation. $C_e$ in FIG. 4 is the covariance of the estimate, which intuitively "remembers" the weighted sum of the error between the predicted output and the measured output, and is used to improve the estimate of the package temperature.

Example DTM Controller

The operation of an example DTM controller that may be used in the example system of FIG. 2 is described below. In example implementations, a function of the DTM controller is to determine appropriate processor core speeds to achieve a stated objective (e.g., a percentage increase in energy efficiency or processor performance) using given power and thermal models, while ensuring that the specified constraints are satisfied. An advantage of the proposed closed-loop controller design of FIG. 2 is that operation of DTM controller 202 is not tied to the design of the feedback loop. Thus, in some implementations, the DTM controller is not bound to any specific type of objective or constraint functions. Also, in some implementations, there are no restrictions on the DTM controller the objective type (linear/non-linear) or the complexity of the process required to achieve the objective. In some implementations, the only input that the DTM controller needs is the updated package temperature from the Kalman filter, as shown in FIG. 2. The following example of improving (e.g., maximizing) overall energy efficiency of a processor illustrates the operation of the DTM controller.

$$\max_{s(k)} \frac{\sum_{c=0}^{c=n}(w_c s_c)^\alpha}{\sum_{c=0}^{c=n} P_c} \quad (9)$$

$$\text{s.t.} \quad T(k+1) = T_p(k+1) + RP(k) \quad (10)$$

$$T(k+1) \le T_{max} \quad (11)$$

$$P_c(k) = P_{d,c} u_c(k) s_c^3(k) + P_{l,c,11} s_c(k) T_c(k) + \quad (12)$$
$$\quad P_{l,c,01} T_c(k) + P_{l,c,12} s_c(k) T_c^2(k) + P_{l,c,02} T_c^2(k), \forall c$$

$$0_{n\times 1} \le s(k) \le 1_{n\times 1}. \quad (13)$$

Equation (9) is an expression for maximizing energy efficiency of a processor. In equation (9), $w_c$ is a weighting factor that is predetermined, and that provides a controllable way to define the importance of a specific core (this may be more important in heterogeneous core design). Additionally, a represents another design parameter, which dictates the importance of performance in relation to power consumption, as described above. The computation of core temperatures for a next time interval is given by equation (10). In equation (10), to determine the temperature in the next time interval, the power consumption of the current time interval is used, as it is not possible to estimate future core utilization. The constraint on maximum temperature is given equation (11). Equation (12) is the same as equation (5) above. The range of allowable core speeds is specified in equation (13). The above formulation is quasi-convex with respect to core speeds s. Therefore, the solution to the above formulation can be obtained using any appropriate standard convex optimizer. The processor core speeds are set according to the solution of the above optimization.

Example Operation

Table 2 below illustrates an example process that may be performed by the control system of FIG. 2 for controlling the core speed (s) and corresponding voltage (v) of a multi-core processor in order to improve (e.g., to maximize) energy efficiency (e.g., PPW) of the processor. As noted above, changes to the core speed may propagate automatically to the core voltage; accordingly, changing speed (s) results in a corresponding core voltage change.

TABLE 2

Input: Number cores n;
    Sensor measurements: processor power $P_m$, core
    Temperatures $T_m$, and core utilizations (u);
    Objective to maximize;
Output: Core speeds (s)
Build power and thermal models by executing benchmarks and measuring $P_m$; $T_m$ and u
Let package temperature $T_p(0) = T_{ambient}(0)$;
for every $kt_s$, $k \in \mathcal{N}$, $t_s \in [1 \text{ ms}, 10 \text{ ms}]$ do
    1. Using models, compute s(k) that maximizes the objective while ensuring predicted $T(k \leq T_{max})$
    2. Predict future temperature $T_p$ (k + 1) using $T_p$ (k) and P (k)
    3. Compute error $e(k) = [T^T(k)P(k)]^T - [T_m^T(k)P_m(k)]^T$;
    4. Adjust $T_p$ (k + 1) based on e(k) to minimize future prediction error
end The process of Table 2 uses the inputs noted therein and defined above, and the models noted therein and defined above. Referring to FIG. 2, the process may be implemented using Kalman filter 201, DTM controller 202 (which includes the power and thermal models 205 described above), and processor 203. In operation, DTM controller 202 uses an initial value, in this example a temperature of the processor package 210, to determine, using power and thermal models 205, a core speed (s) that satisfies a specified objective. In this regard, the objective may be maximum efficiency (PPW) or some other objective specified by the formulation of Per $f^\alpha$/Power, where $\alpha$ is a control parameter that is used to strike a performance-power balance.

In this regard, in some implementations, the relative importance of performance or energy is controlled by $\alpha$. In some implementations, setting $\alpha>1$, emphasizes the importance of performance over energy reduction, whereas setting $0<\alpha<1$ emphasizes the importance of energy reduction over performance. This metric may be useful in scenarios where certain operations demand higher performance, while other applications can be slowed-down to lower energy consumption. For instance, in a smartphone, operations such as channel estimation, demodulation, and audio and video modulation-demodulation are a high priority and demand higher performance, whereas applications such as web browsers, electronic mail (e-mail) clients, rasterization, and pixel blending can afford a slower execution and can thus contribute towards energy savings. By varying $\alpha$, it is possible to express, mathematically, the relationship between processor performance and PPW. The value of a may correspond to changes to aspects of the power and thermal models and/or to operational aspects of the processor in order to achieve the objective specified by $\alpha$, e.g., emphasis on performance or emphasis on energy efficiency. In the example presented below, $\alpha$ is set to achieve maximum energy efficiency.

In this example implementation, DTM controller 202 determines processor core speeds (s) directed at achieving energy efficiency, given the above temperature constraints. In the example implementation of Table 2, this corresponds to "Using models, compute s(k) that maximizes the objective while ensuring predicted T(k)_Tmax". As shown in FIG. 2, in making its determination, DTM controller 202 takes into account processor workload characteristics 220, such as assignments of task to cores, core capabilities, or the like.

DTM controller 202 outputs, to processor 203, core speeds 211 that include process noise 212 (e.g., prediction error). The core speeds are directed to maximizing energy efficiency of the processor in this implementation. Cores of the processor are run at the corresponding speeds; however, due to inaccuracies resulting from process noise, maximum energy efficiency is not achieved using these core speeds. Accordingly, correction of the models in DTM controller 202 is performed via the feedback loop 215 involving Kalman filter 201.

In this regard, using the power and thermal models determined above, DTM controller 202 also predicts, for a next time interval, power and temperature values 216 for the cores. In the example implementation of Table 2, this corresponds to "Predict future temperature Tp(k+1) using Tp(k) and P(k)". These are fed back as inputs to Kalman filter 201, as shown.

Sensors (not shown) on processor 203 obtain a temperature 218 of the processor's package and power consumption of the processor. The obtained temperature and power values may also be inaccurate due to noise from the sensors. Kalman filter 201 accounts for such inaccuracies as well when predicting temperature and power. Kalman filter 201 generates an error value (shown in FIG. 2 as "updated package temperature") corresponding to the difference between the predicted temperature and the temperature measured by the sensor. In the example implementation of Table 2, this corresponds to:

$$\text{Compute error } e(k) = [T^T(k)P(k)]^T - [T_m^T(k)P_m(k)]^T$$

This error is used to update models 205 in DTM controller 202 to provide more accurate temperature and power predictions, and thus core speeds that converge on a desired energy efficiency (maximum energy efficiency, in this example). In the example implementation of Table 2, this corresponds to: "Adjust Tp(k+1) based on e(k) to minimize future prediction error". The closed feedback loop may run until an appropriate level of accuracy is obtained.

The process implemented by the control system of FIG. 2 may be implemented in real-time. For example, the objective of the process may be changed during the optimization, and the process may continue with a new objective (e.g., less emphasis on energy and more on performance).

As noted above, an advantage of the system of FIG. 2 is that the Kalman filter is implemented separately from the DTM controller. For example, in an example software implementation, code for the Kalman filter and the DTM controller are part of separate programs, threads, or modules, which interact, but which do not share code. In an example hardware implementation, the Kalman filter and the DTM controller are part of separate circuits, chips, or other discrete components, which interact, but which do not share hardware. By separating the Kalman filter and DTM controller, it may be possible to employ the same DTM controller to achieve different objectives (as defined, e.g., by the formulation of $f^\alpha$/Power). For example, different Kalman filter corrections may be used for different emphases on performance or power. Because the Kalman filter is separate from the DTM controller, at least in some implementations, there is a reduced need to change the DTM controller. Notably, in some implementations, the Kalman filter and the DTM controller may be combined.

Figure 5:
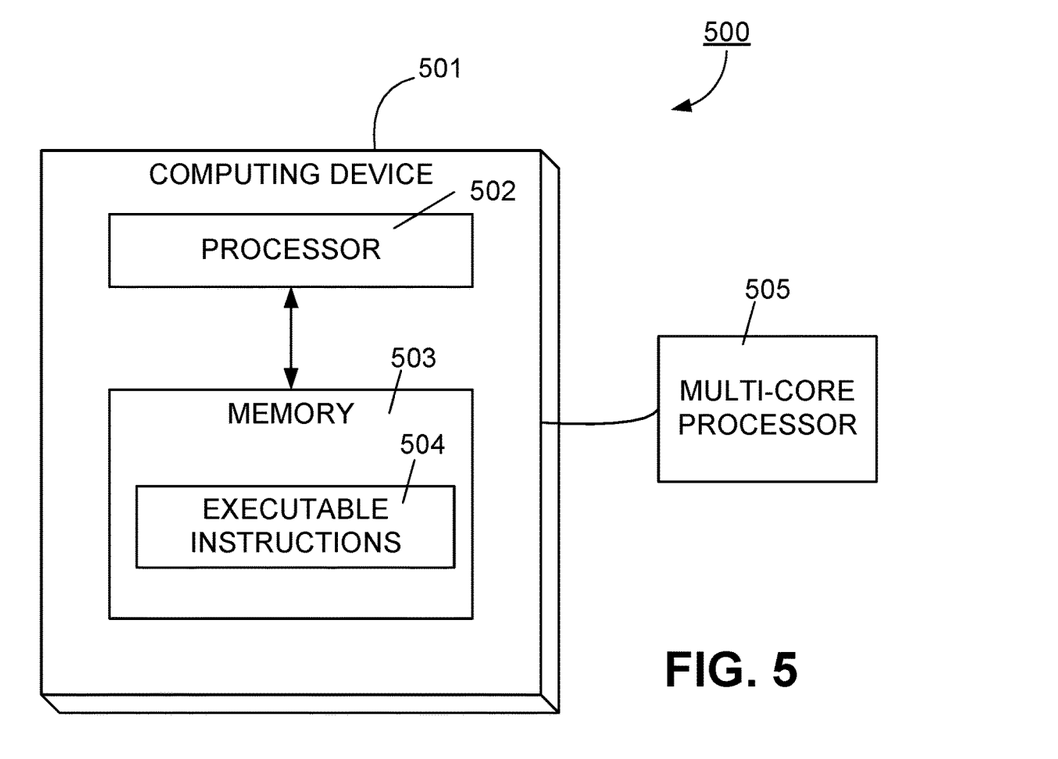
FIG. 5 is a block diagram showing an example system that may be used to implement the closed-loop control system described herein.

As explained above, the closed loop system and corresponding processes described herein may be performed using any appropriate computing device that includes a processor. FIG. 5 shows an example configuration of a system 500 including a computing device 501 that interacts with multi-core processor 505 to implement a controller to determine parameters that result in a desired (e.g., optimized) PPW for multi-core processor. In this example implementation, computing device 501 includes its own processor and memory storing instructions that are executable to perform the processes described herein, including process described with respect to Table 2. In some implementations, all or part of the functionality of computing device 501 may be implemented on one or more cores of multi-core processor 505.

All or part of the closed loop system and corresponding processes described herein and their various modifications (hereinafter referred to as "the processes") can be implemented, at least in part, via a computer program product, i.e., a computer program tangibly embodied in one or more non-transitory machine-readable storage media (e.g., hardware devices, such as a hard drive, computer memory, or the like), for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Other implementations not specifically described herein are also within the scope of the following claims.

What is claimed is:

1. A control system for use with a processor, comprising:
a controller configured to receive prediction information for a predicted temperature associated with the processor, and to determine a speed of operation for the processor based at least on a thermal model of the processor and the predicted temperature, the speed supporting an operational objective of the processor; and
an error estimator that is separate from the controller, and that is configured to receive temperature information obtained from the processor operating at the speed, to determine updated prediction information based, at least in part, on the temperature information, and to output the updated prediction information to the controller;
wherein the controller is further configured to control the speed of operation of the processor based, at least in part, on the updated prediction information from the error estimator, and
wherein the thermal model of the processor comprises the following equation:

$$T(k) = T_p + RP(s, T, k), \text{ where}$$

$$T_p(k+1) a T_p(k) + b \sum_{c=1}^{n} P_c(s_c, T_c, k),$$

$$P_c(s_c, T_c, k) = P_{d,c} u_c(k) s_c^3(k) + P_{i,c,11} s_c(k) T_c(k) +$$
$$P_{i,c,01} T_c(k) + P_{i,c,12} s_c(k) T_c^2(k) + P_{i,c,02} T_c^2(k),$$

$$a \stackrel{\Delta}{=} 1 = \frac{\Delta t}{R_p C_p},$$

$$b \stackrel{\Delta}{=} \frac{\Delta t}{C_p},$$

$\Delta t$ is a length of a discrete time step, k refers to time $k\Delta t$, n refers to a number of cores, $s_c$ refers to a normalized clock speed of core c, $P_c$ refers to a total power consumed by core c, $P_{d,c,b}$ refers to a dynamic power of block b in core c, $T_c$ refers to a temperature of core c, $P_{l,c,ij}$ refers to leakage power coefficients ij of core c, $R_p$ refers to a resistance of package p of the processor, $C_p$ refers to a capacitance of package p of the processor, and $U_c$ refers to a utilization of core c.

2. The control system of claim 1, wherein the controller is configured to provide the predicted temperature to the error estimator; and
wherein the error estimator is configured to determine the updated prediction information based on both the predicted temperature and the temperature information.

3. The control system of claim 2, wherein the error estimator is configured to receive measured power information obtained from operation of the processor and predicted power information from the controller, the predicted power information being obtained from a power model on the controller; and wherein the error estimator is configured to use the measured power information and the predicted power information in a process for determining the updated prediction information.

4. The control system of claim 1, wherein the controller is configured to obtain a metric corresponding to the operational objective of the processor, and to incorporate the metric into determination of the speed of operation of the processor.

5. The control system of claim 1, wherein the processor is a multi-core processor, and the temperature information is obtained from the processor comprises a single temperature value.

6. The control system of claim 5, wherein the single temperature value comprises a measured temperature of a package of the processor.

7. The control system of claim 1, wherein the prediction information corresponds to an error between (i) previously-obtained temperature information corresponding to a previously-measured temperature and (ii) a previous predicted temperature; and
wherein the controller is configured to update the predicted temperature based on the prediction information.

8. The control system of claim 1, wherein the error estimator comprises a Kalman filter, and the controller comprises a dynamic thermal management controller.

9. The control system of claim 1, wherein the error estimator, the controller, and the processor are part of a closed-loop system; and
wherein the operational objective is improved energy efficiency.

10. The control system of claim 1, wherein the error estimator, the controller, and the processor are part of a closed-loop system; and
wherein the operational objective is improved processor performance.

11. The control system of claim 1, wherein the operational objective is changeable in real-time to thereby cause changes in operation of the controller and the error estimator.

12. A method of controlling a processor, comprising:
receiving, at a controller, prediction information for a predicted temperature associated with the processor;
determining, via the controller, a speed of operation for the processor based at least on a thermal model of the processor and the predicted temperature, the speed supporting an operational objective of the processor;
receiving, at an error estimator that is separate from the controller, temperature information obtained from the processor operating at the speed;
determining, via the error estimator, updated prediction information based, at least in part, on the temperature information;
outputting, from the error estimator, the updated prediction information to the controller; and
controlling the speed of operation of the processor based, at least in part, on the updated prediction information from the error estimator,
wherein the thermal model of the processor comprises the following equation:

$$T(k) = T_p + RP(s, T, k), \text{ where}$$

$$T_p(k+1) a T_p(k) + b \sum_{c=1}^{n} P_c(s_c, T_c, k),$$

-continued
$$P_c(s_c, T_c, k) = P_{d,c} u_c(k) s_c^3(k) + P_{i,c,11} s_c(k) T_c(k) + P_{i,c,01} T_c(k) + P_{i,c,12} s_c(k) T_c^2(k) + P_{i,c,02} T_c^2(k),$$

$$a \triangleq 1 = \frac{\Delta t}{R_p C_p},$$

$$b \triangleq \frac{\Delta t}{C_p},$$

$\Delta t$ is a length of a discrete time step, k refers to time $k\Delta t$, n refers to a number of cores, $s_c$ refers to a normalized clock speed of core c, $P_c$ refers to a total power consumed by core c, $P_{d,c,b}$ refers to a dynamic power of block b in core c, $T_c$ refers to a temperature of core c, $P_{l,c,ij}$ refers to leakage power coefficients ij of core c, $R_c$ refers to a resistance of package p of the processor, $C_p$ refers to a capacitance of package p of the processor, and $U_c$ refers to a utilization of core c.

13. The method of claim 12, wherein the controller provides the predicted temperature to the error estimator; and
wherein the error estimator determines the updated prediction information based on both the predicted temperature and the temperature information.

14. The method of claim 13, wherein the error estimator receives measured power information obtained from operation of the processor and predicted power information from the controller, the predicted power information being from a power model on the controller; and
wherein the error estimator uses the measured power information and the predicted power information in a process for determining the updated prediction information.

15. The method of claim 12, wherein the controller obtains a metric corresponding to the operational objective of the processor, and incorporates the metric into determination of the speed of operation of the processor.

16. The method of claim 12, wherein the processor is a multi-core processor, and the temperature is information obtained from the processor comprises a single temperature value.

17. The method of claim 16, wherein the single temperature value comprises a measured temperature of a package of the processor.

18. The method of claim 12, wherein the prediction information corresponds to an error between (i) previously-obtained temperature information corresponding to a previously-measured temperature and (ii) a previous predicted temperature; and
wherein the controller updates the predicted temperature based on the prediction information.

19. The method of claim 12, wherein the error estimator comprises a Kalman filter, and the controller comprises a dynamic thermal management controller.

20. The method of claim 12, wherein the error estimator, the controller, and the processor are part of a closed-loop system; and
wherein the operational objective is improved energy efficiency.

21. The method of claim 12, wherein the error estimator, the controller, and the processor are part of a closed-loop system; and
wherein the operational objective is improved processor performance.

22. The method of claim 12, wherein the operational objective is changeable in real-time to thereby cause changes in operation of the controller and the error estimator.

23. One or more non-transitory machine-readable storage media storing instructions that are executable on one or more processing devices to perform operations comprising:
receiving, at a controller, prediction information for a predicted temperature associated with the processor;
determining, via the controller, a speed of operation for the processor based at least on a thermal model of the processor and the predicted temperature, the speed supporting an operational objective of the processor;
receiving, at an error estimator that is separate from the controller, temperature information obtained from the processor operating at the speed;
determining, via the error estimator, updated prediction information based, at least in part, on the temperature information;
outputting, from the error estimator, the updated prediction information to the controller; and
controlling the speed of operation of the processor based, at least in part, on the updated prediction information from the error estimator,
wherein the thermal model of the processor comprises the following equation:

$T(k) = T_p + RP(s, T, k)$, where $T_p(k+1) a T_p(k) + b \sum_{c=1}^{n} P_c(s_c, T_c, k),$ $P_c(s_c, T_c, k) = P_{d,c} u_c(k) s_c^3(k) + P_{i,c,11} s_c(k) T_c(k) +$
$P_{i,c,01} T_c(k) + P_{i,c,12} s_c(k) T_c^2(k) + P_{i,c,02} T_c^2(k),$ $a \triangleq 1 = \dfrac{\Delta t}{R_p C_p},$ $b \triangleq \dfrac{\Delta t}{C_p},$ $\Delta t$ is a length of a discrete time step, k refers to time $k\Delta t$, n refers to a number of cores, $s_c$ refers to a normalized clock speed of core c, $P_c$ refers to a total power consumed by core c, $P_{d,c,b}$ refers to a dynamic power of block b in core c, $T_c$ refers to a temperature of core c, $P_{l,c,ij}$ refers to leakage power coefficients ij of core c, $R_c$ refers to a resistance of package p of the processor, $C_p$ refers to a capacitance of package p of the processor, and $U_c$ refers to a utilization of core c.

* * * * *